M. C. TUNISON.
TRACTOR ATTACHMENT FOR AUTOMOBILES.
APPLICATION FILED MAY 14, 1918.
1,356,945.
Patented Oct. 26, 1920.
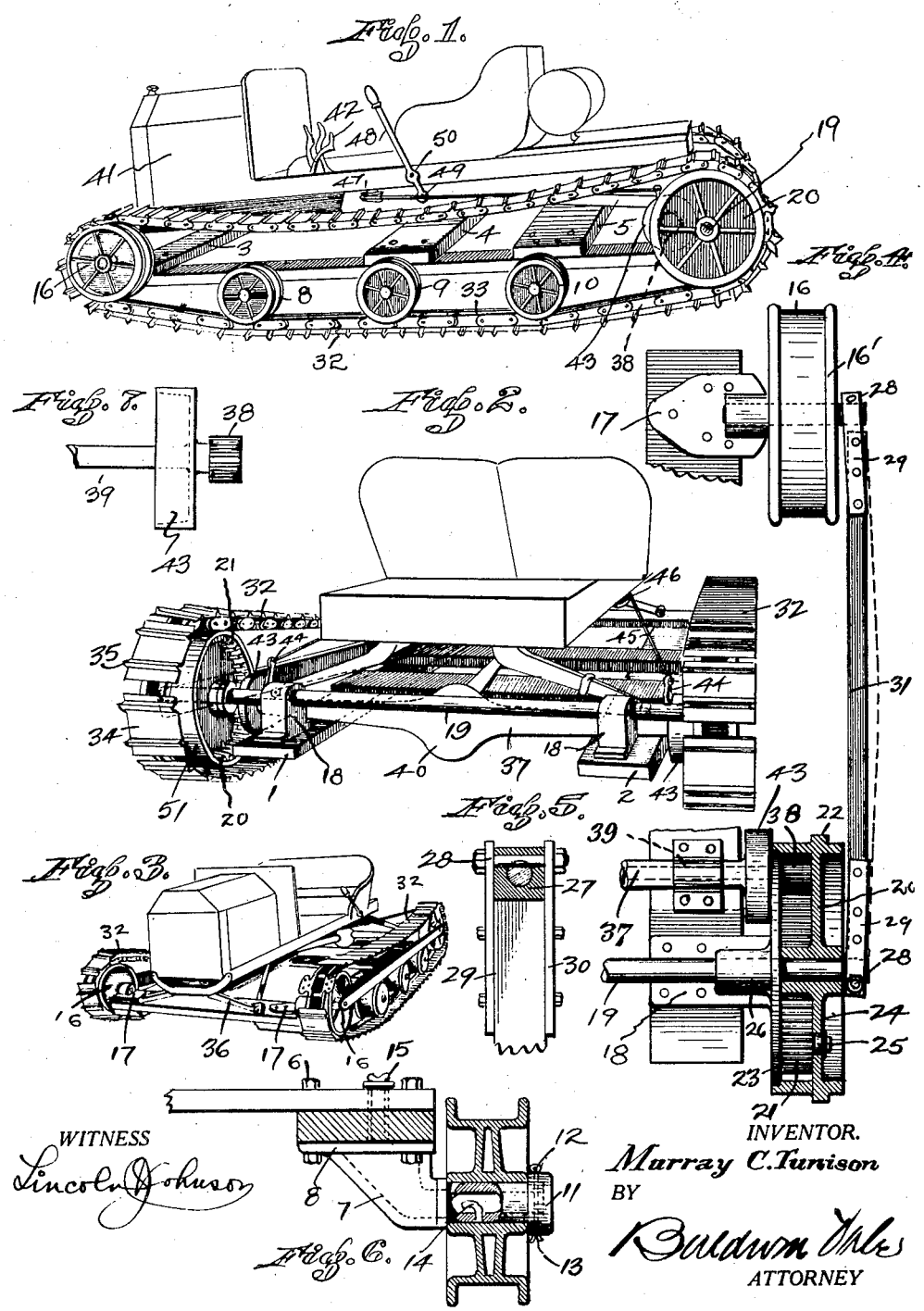
WITNESS
Lincoln Johnson
INVENTOR.
Murray C. Tunison
BY
Baldwin Vale
ATTORNEY

UNITED STATES PATENT OFFICE.

MURRAY C. TUNISON, OF CHICO, CALIFORNIA, ASSIGNOR TO TUNISON & NUNN, OF CHICO, CALIFORNIA, A COPARTNERSHIP CONSISTING OF MURRAY C. TUNISON AND SAMUEL J. NUNN.

TRACTOR ATTACHMENT FOR AUTOMOBILES.

1,356,945.  Specification of Letters Patent.  Patented Oct. 26, 1920.

Application filed May 14, 1918. Serial No. 234,421.

*To all whom it may concern:*

Be it known that I, MURRAY C. TUNISON, a citizen of the United States, and a resident of the city of Chico, county of Butte, State of California, have made a new and useful invention—to wit, Tractor Attachments for Automobiles; and I hereby declare the following to be a full, clear, exact, and concise description of the same.

The invention relates particularly to tractors of the traction belt type.

Among the objects of the invention are to provide an attachment or traction platform adapted to receive a whole automobile with the front axle and front and rear wheels removed upon which is mounted traction belts adapted to tractively support the load on the platform and to which the driven axle of the automobile can be conveniently geared to drive the traction belts.

Another object is to so construct the traction platform that it combines strength and resiliency and is adapted to be easily constructed of generally available material and by combining the major advantages of more expensive types of tractors.

In this specification and the annexed drawing the invention is illustrated in the form considered to be the best, but it is to be understood that the invention is not limited to such form, because it may be embodied in other forms, and it is also to be understood that in and by the claims following the description, it is desired to cover the invention in whatever form it may be embodied.

In the accompanying one sheet of drawings:

Figure 1 is a side view in perspective of a traction platform and automobile combined in accordance with this invention, with the reach bar omitted in order that the frame construction might be clearly illustrated.

Fig. 2 is a rear view of the same.

Fig. 3 is a similar front view of the same.

Fig. 4 is a plan view from above in fragmentary detail illustrating the traction belt, support, and driving mechanism.

Fig. 5 is a detached enlarged detail of the end of the reach bar.

Fig. 6 is an enlarged detail of the supporting traction roller bracket.

Fig. 7 is an enlarged detail of the combined pinion and brake drum.

In detail the construction illustrated in the drawings includes a traction platform preferably composed of the side bars 1 and 2 having the cross braces 3, 4 and 5. For this platform I prefer to use planks of lumber of clear grain and about two inches thick by twelve inches wide, varying with the quality of the wood and the load to be supported. While wood is preferred because it is easily obtainable and the frame more easily assembled of this material, it is obvious that flat plates of steel or other material may be substituted when desired. At all points of conjunction the side beams 1 and 2 and the cross strips 3, 4 and 5 are suitably joined by bolts passing therethrough and the parts firmly joined together thereby, either by overlapping, mortising or other forms of joints common to this art.

The traction roller brackets 7 are provided with a base flange 8 to receive the bolts 6 passing through the side bars 1 and 2 and the braces 4 and 5, the brackets being held in rigid assembly by the bolts. The traction rollers 8, 9 and 10 are mounted upon the brackets upon which they are held by the suitable caps 11 held in place by the split pins 12 passing through the end of the spindles 13 of these brackets. The spindles 13 are hollow and communicate with the hollow interior of the brackets 7 and are perforated to receive a wick 14 by which oil is fed to the journal by capillary attraction from the hollow spindle. The oil is introduced into the hollow bracket 7 through an opening closed by the cap 15, the bracket acting as an oil reservoir holding a considerable quantity of lubricant. At opposite ends of the platform the front pulleys 16—16 are mounted upon the brackets 17—17 fixed at the two forward corners of the platform on top of the cross brace 3.

At the rear the pillow brackets 18—18 are securely bolted to the ends and on top of the side bars 1 and 2 in transverse alinement to receive the cross shaft 19 fixed in the brackets 18. The driving sprockets 20—20 are journaled on the opposite ends of the cross shaft 19 and revolve freely thereon. The sprockets 20 are preferably of drumlike form having the internal gears 21 therein and provided on their peripheries with the teeth 22 to engage the traction belt. The internal gear is protected from dirt by the shroud plates 23 fitting within the sprocket drums 20 which have the central web 24 excluding dirt on the opposite side and provided with screw plugs 25 through which lubricants can be introduced. The pulleys 16 and the sprocket drum 20 are held on their respective spindles by blocks, such as 27, engaging the spindles and fixed thereto by cross bolt 28 passing through the blocks and engaging a notch in the spindles and clamping the blocks between the plates 29 and 30, bolted to opposite ends of the reach bar 31, extending on opposite sides of the traction platform to preserve the parallel axial alinement of the brackets 17—17 and the cross-shaft 19.

The endless traction belts 32—32 are composed of link chains 33 of any suitable construction, having the traction plates or shoes 34 fixed thereto and provided with grousers 35 to increase tractive friction. These endless belts encircle the front pulleys 16—16 and the rear sprockets 20—20 in such a manner that the traction rollers 8, 9 and 10 on opposite sides of the machine travel on top of the chains 33 intermediate the pulleys 16 and sprockets 20 and support the weight upon the traction platform.

It is one of the objects in the design of this machine to so construct the traction platform that it will receive, without necessary modification, an entire automobile or automobile chassis by simply removing the usual conventional automobile front and rear wheels and front axle and fastening the front springs and rear axles to the platform. For illustration I have chosen an automobile of conventional and recognizable type, removed the entire front axle including the wheels and detached steering mechanism and fastened the front springs 36 to the front cross brace 3. The rear wheels have been removed and the rear axle housing 37 rested upon the cross bars 1 and 2 and securely attached thereto. By thus mounting the automobile chassis the spring suspension is unimpaired, and its control and other equipment unaltered.

For the rear wheels removed, the driving pinions 38 have been substituted and fixed to the driving shafts 39 journaled in the rear housing 37 and connected through the usual differential in the housing 40, through the transmission to the motor contained within the bonnet 41, changed speed ratios being controlled through the foot pedals 42 or otherwise in accordance with the equipment of the automobile thus combined with the traction element. The pinions 38 enmesh with integral gears 21 whereby the rotation of the drive shafts 39 through the differential rotates the sprockets 20—20 and through the sprocket teeth 22 engages the chains 33 to roll the platform forward on its supporting rollers 8, 9 and 10 on the ground portion of the traction belt, which remains stationary on the ground, as common to this type of traction element.

The brake drums 43—43 are preferably formed integrally with the driving pinions 38 and receive the usual brake bands or other braking mechanism controlled by the levers 44—44, which are joined together by a flexible cable 45 having its opposite end connected to said brake levers 44 and passing around the pulleys 46 and 47 and fixed to the lever 48 at 49. This lever is pivoted at 50 on the frame or any convenient place on the traction platform whereby the arcuate movement of the lever 48 forward and back synchronously advances or retracts one or the other of the levers 44—44 applying or releasing the brake mechanisms controlled thereby.

The machine is steered by manipulation of the lever 48 which locks the braking mechanism on one side of the machine, while the motive power acting through the differential at 40 to transmit the drive entirely to the other side at increased speed, causes the active traction belt to travel around the inactive one causing a complete turning of the machine. As illustrated in the drawings, Fig. 1 with the lever 48 thrown forward, the brake mechanism on the right hand side is locked which holds the traction belt inactive on that side, which then becomes the pivotal side of the machine, the traction belt on the left hand side being driven travels in a circle around the pivotal point in the right hand traction belt. Reversal of the lever of course has the reverse effect. In the type of automobiles shown the transmission is provided with a brake arresting movement of the machine through the operation of the differential and interconnected drive to the rear shafts 39. In machines not having this type of transmission brake, the exterior of the sprocket drums as at 51 may be provided with band brakes to accomplish the same purpose. Automobiles having full floating rear axles require a little different treatment than that illustrated in applying the driving pinions 38 in the rear sprockets. However the power transmitted through the axle shafts is always available for driving the rear sprockets with suitable intermediate mechanism.

In advancing the tractor when it has a trailing load, such as a plow, or other resistance to its progress, great strain is thrown on the chains 33 on both sides of the machine. These chains being stationary, the revolving sprockets transmit the draw bar pull to these chains, which stress tends to draw the forward pulleys 16 and rear sprockets 20 together, to obviate which I interpose the reach rods 31, which are preferably also of wooden timbers, because of elasticity. Should an unusual strain come on either or both of the chains 33, such as would tend to break them or distort the proper alinement of the traction platform, these reach rods 31 will bow outwardly as indicated in dotted lines in Fig. 4. This will permit the chains 33 to ride over the flanges 16' of the pulleys 16 in extreme cases, or in ordinary cases will relieve momentarily the tension on the chains to prevent breaking. To insure the outward bowing of the reach rods 31, I set the plates 29 and 30 slightly out of alinement longitudinally with the rod 31, which is illustrated in a slightly exaggerated degree in Fig. 4, this peculiar arrangement insuring the bowing outward of the rods 31 for the purpose specified, without interfering with their proper functioning under normal conditions, which is to maintain the proper distance between the axes of the pulleys 16 and the sprockets 20.

Flexibility and strength is a prime consideration in the construction of a traction platform in accordance with this invention. For this reason the cross braces 4 and 5 are placed at the points of greatest supporting and tractive stresses of the load. The extension of the side bars 1 and 2 forward of the brace 4 gives great flexibility forward of the supporting rollers 9, as the forward end of the tractor negotiates rises over inequalities in the road surface, permitting the entire front or one corner of the frame to arise in climbing over obstructions. The greatest strain on the frame coming at the rear, the brace 5 is interposed intermediate the brace 9 and the cross shaft 19, minimizing and stabilizing the flexibility in the rear of the frame without rendering it too rigid. The frame of the automobile is designed to take oblique and transverse stresses, which adds to the stability of the tractor platform when the two are combined. It has therefore been found unnecessary to interpose oblique braces or tie rods in the tractor platform except under unusual conditions.

A tractor of this nature is particularly useful in that it combines all of the comforts, mode of operation, electric lights, and other conveniences of the automobile, making it either convertible as a tractor or as a wheeled vehicle of general utility.

Having thus described this invention, what I claim and desire to secure by Letters Patent is:

1. A tractor including a platform; pulleys and sprockets journaled on said platform; traction belts encircling said pulleys and sprockets; flexible reach bars interposed between the axes of said pulleys and sprockets on the outer sides thereof, an automobile with its front axle and traction elements removed, mounted upon said platform; and gearing interposed between the motive power of said automobile and said sprockets.

2. A tractor including a flexible platform; a cross shaft mounted in brackets on said platform; sprockets journaled on said shaft; pulleys journaled on said platform; flexible reach bars interposed between the axes of said pulleys and sprockets on the outer sides thereof; traction belts encircling said pulleys and sprockets; an automobile supported on said platform and having its rear axle in fixed relation to said cross shaft; and suitable gearing interposed between said sprockets and the driven shafts in said automobile axle.

3. A tractor including a flexible platform; a cross shaft mounted in brackets on said platform; sprockets journaled on said shaft; pulleys journaled on said platform; flexible reach bars interposed between the axes of said pulleys and sprockets on the outer sides thereof; traction belts encircling said pulleys and sprockets; an automobile supported on said platform and having its rear axle in fixed relation to said cross shaft; and suitable gearing interposed between said sprockets and the driven shafts in said automobile axle; and means for steering said tractor by alternately setting or releasing the brakes of said automobile on either side thereof adjacent to said sprockets respectively.

4. A tractor including a flexible platform; a cross shaft mounted in brackets on said platform; sprockets journaled on said shaft; pulleys journaled on said platform; flexible reach bars interposed between the axes of said pulleys and sprockets on the outer sides thereof; traction rollers journaled on brackets fixed to said platform intermediate said pulleys and sprockets; traction belts encircling said pulleys, rollers and sprockets; an automobile supported on said platform and having its rear axle in fixed relation to said cross shaft; suitable gearing interposed between said sprockets and the driven shafts in said automobile axle; and means for steering said tractor through the differential gearing of said automobile by alternately setting or releasing the brakes of said automobile on either side thereof adjacent to said sprockets respectively.

5. A tractor including a platform; pulleys journaled on the front end, and sprockets journaled on the rear end of said platform: traction rollers journaled on hollow spindles on hollow oil containing brackets fixed to said platform intermediate said pulleys and sprockets; traction belts encircling said pulleys, rollers and sprockets; an automobile with its front axle and traction elements removed, mounted upon said platform; and gearing interposed between the motive power of said automobile and said sprockets.

6. A tractor including a flexible platform; pulleys journaled on the front end and sprockets journaled on the rear end of said platform; flexible reach bars interposed between the axes of said pulleys and sprockets on the outer sides thereof; traction rollers journaled on hollow spindles on hollow oil containing brackets fixed to said platform intermediate said pulleys and sprockets; traction belts encircling said pulleys, rollers and sprockets; an automobile with its front axle and traction elements removed, mounted on said platform; and gearing interposed between the motive power of said automobile and said sprockets.

In testimony whereof I have hereunto set my hand at Chico, California, this 25th day of April 1918.

MURRAY C. TUNISON.

In presence of—
BALDWIN VALE,
LINCOLN V. JOHNSON.